(12) United States Patent
Wessberg et al.

(10) Patent No.: US 12,064,940 B2
(45) Date of Patent: Aug. 20, 2024

(54) SLIDING LAMINATED GLAZING UNIT WITH LATERAL INNER PROJECTION

(71) Applicant: SAINT-GOBAIN GLASS FRANCE, Courbevoie (FR)

(72) Inventors: Henrik Wessberg, Ballingslov (SE); Thibault Rapenne, Noyon (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 356 days.

(21) Appl. No.: 17/612,140

(22) PCT Filed: Jun. 3, 2020

(86) PCT No.: PCT/EP2020/065338
§ 371 (c)(1),
(2) Date: Nov. 17, 2021

(87) PCT Pub. No.: WO2020/245192
PCT Pub. Date: Dec. 10, 2020

(65) Prior Publication Data
US 2022/0242201 A1    Aug. 4, 2022

(30) Foreign Application Priority Data

Jun. 5, 2019  (FR) ...................................... 1905947

(51) Int. Cl.
*B32B 15/04*   (2006.01)
*B32B 1/00*    (2006.01)
(Continued)

(52) U.S. Cl.
CPC .......... *B32B 17/10293* (2013.01); *B32B 1/00* (2013.01); *B32B 7/12* (2013.01);
(Continued)

(58) Field of Classification Search
CPC ................................................ B32B 17/10036
(Continued)

(56) References Cited

U.S. PATENT DOCUMENTS 3,375,626 A * 4/1968 Grotefeld .......... B32B 17/10302
52/204.597
2014/0141206 A1* 5/2014 Gillard .............. B32B 17/10137
428/174
(Continued)

FOREIGN PATENT DOCUMENTS

EP    EP 0 600 766 A1    6/1994
EP    JR EP 0 908 302 A2    4/1999
(Continued)

OTHER PUBLICATIONS

International Search Report as issued in International Patent Application No. PCT/EP2020/065338, dated Sep. 3, 2020.

*Primary Examiner* — Lauren R Colgan
(74) *Attorney, Agent, or Firm* — Pillsbury Winthrop Shaw Pittman LLP

(57) ABSTRACT

A vehicle glazing unit includes a pane including at least an outer glass sheet, an inner glass sheet and a sheet of adhesive material, the pane having an upper border, a lower border, a first lateral border and a second lateral border; the outer glass sheet and the inner glass sheet are each a glass sheet having undergone a thermal toughening or semi-toughening treatment, the edge of the inner glass sheet being situated beyond the edge of the sheet of adhesive material and beyond the edge of the outer glass sheet only over at least one portion of the length or even the whole length of the first lateral border and/or over at least one portion of the length or even the whole length of the second lateral border of the pane.

16 Claims, 3 Drawing Sheets

(51) Int. Cl.
  *B32B 7/12* (2006.01)
  *B32B 17/06* (2006.01)
  *B32B 17/10* (2006.01)
(52) U.S. Cl.
  CPC .. *B32B 17/10036* (2013.01); *B32B 17/10091* (2013.01); *B32B 17/1055* (2013.01); *B32B 2250/44* (2013.01); *B32B 2307/54* (2013.01); *B32B 2307/558* (2013.01); *B32B 2307/732* (2013.01); *B32B 2307/7376* (2023.05); *B32B 2605/00* (2013.01)
(58) Field of Classification Search
  USPC .................................................. 428/426, 428
  See application file for complete search history.

(56) References Cited

U.S. PATENT DOCUMENTS

2019/0270282 A1* 9/2019 Sauvinet .................... B60J 1/17
2021/0323278 A1* 10/2021 Benedetto ......... B32B 17/10137

FOREIGN PATENT DOCUMENTS

| FR | 2 525 677 A1 | 10/1983 |
| WO | WO 2014/029605 A1 | 2/2014 |
| WO | WO 2018/078280 A1 | 5/2018 |
| WO | WO 2018/078281 A1 | 5/2018 |

* cited by examiner

[Fig. 1]
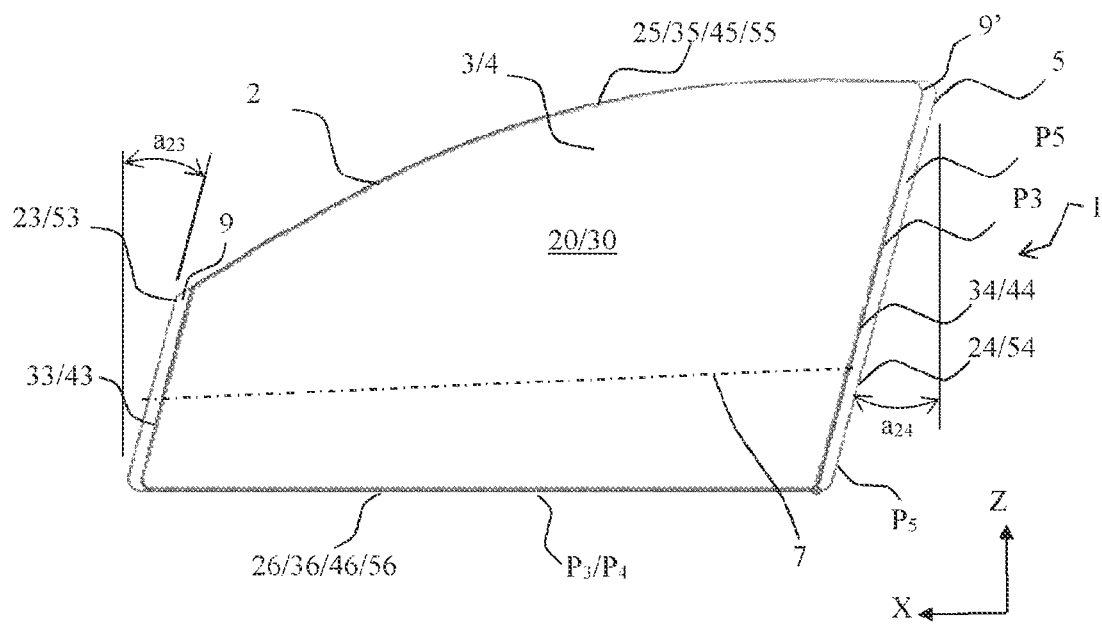
[Fig. 2]
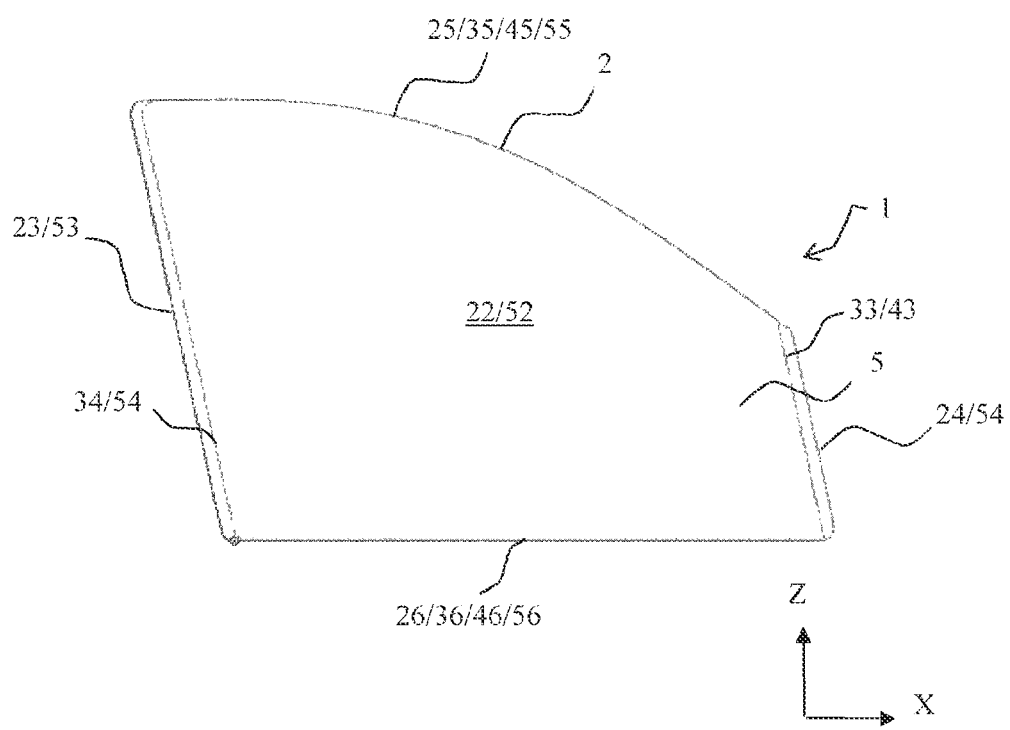

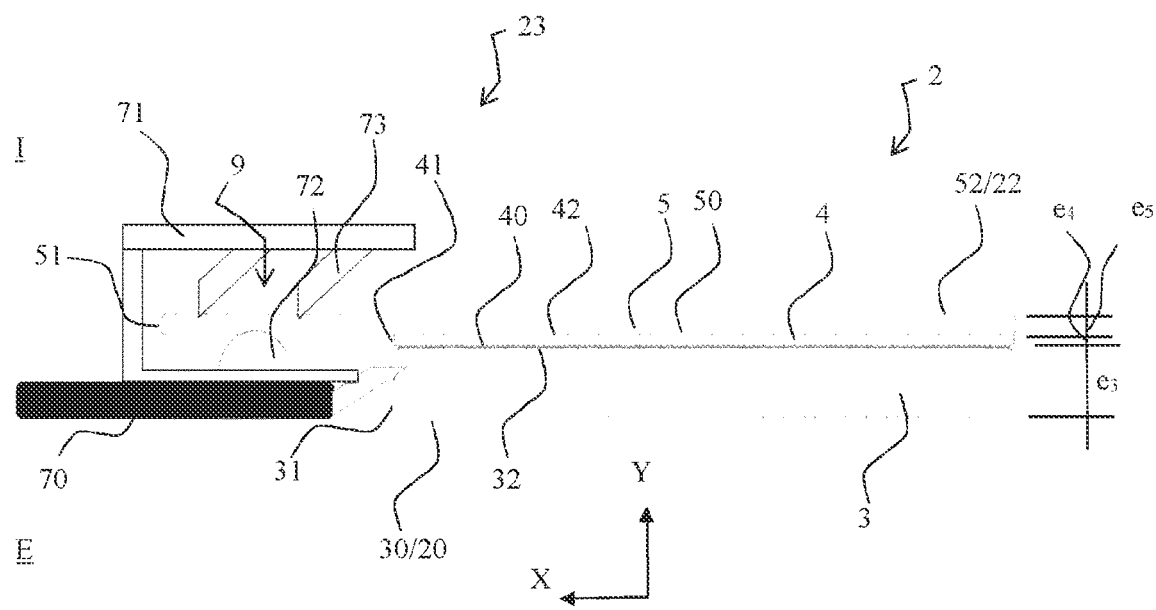
[Fig. 3]
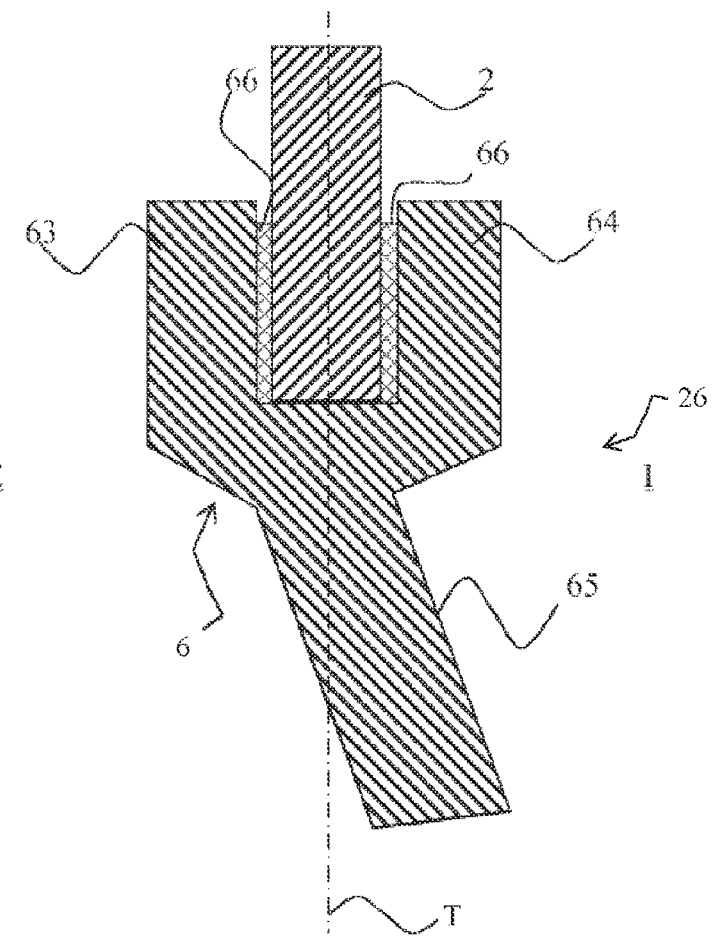
[Fig. 4]

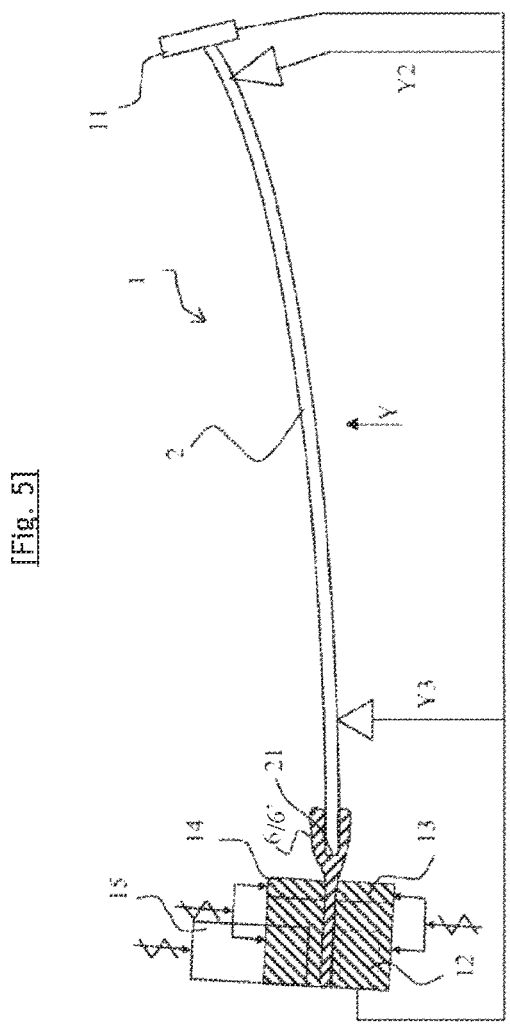

SLIDING LAMINATED GLAZING UNIT WITH LATERAL INNER PROJECTION

CROSS-REFERENCE TO RELATED APPLICATIONS

This application is the U.S. National Stage of PCT/EP2020/065338, filed Jun. 3, 2020, which in turn claims priority to French patent application number 1905947 filed Jun. 5, 2019. The content of these applications are incorporated herein by reference in their entireties.

The present invention relates to a vehicle glazing unit, and in particular a motor vehicle glazing unit, comprising a pane and means for allowing the translational movability of said pane with respect to a door of said vehicle, said pane being curved and laminated and comprising at least an outer glass sheet, an inner glass sheet and a sheet of adhesive material situated between said outer glass sheet and said inner glass sheet, each sheet having a peripheral edge.

The prior art known from patent application EP 908 302 discloses a laminated glazing unit of which an inner pane has a border which extends beyond the border of the outer pane, this inner pane being thermally toughened; however, in this document, the glazing unit is not a movable glazing unit but a fixed glazing unit and the thermal toughening operation has the aim of facilitating the complete breakage of the glazing unit in order to allow escape through the opening, this being far removed from the context of movable glazing units since, to allow escape through the opening of a movable glazing unit, all that is required is to move it.

The prior art known from International patent application no. WO 2014/029605 discloses a laminated movable glazing unit of which the inner glass sheet is thin and can be chemically toughened. This document also indicates the presence of a projection, but the latter is applied to the thick outer glass which is necessarily toughened and curved. This document insists on the fact that the thin glass sheet does not participate actively (but only passively) in the curvature and in the general appearance of the glazing unit.

Moreover, the prior art known from International patent application WO 2018/078280 discloses a glazing unit comprising a curved pane and being noteworthy in that said pane comprises an outer glass sheet, an inner glass sheet and a plastic sheet. said inner glass sheet having undergone a chemical toughening operation and having a thickness between 0.40 and 2.10 mm, or even between 0.40 and 1.80 mm, or even between 0.40 and 1.60 mm, and also being noteworthy in that the edge of the inner glass sheet is situated beyond the edge of the plastic sheet and beyond the edge of the outer glass sheet over at least one portion (that is to say over at least one portion/one border, or over a number of portion/borders or over the whole/periphery) of the length of the edge of said inner glass sheet. The glazed opening arrangement described in this document has a number of disadvantages. First, the inner glass sheet of the pane undergoes, during its manufacturing process, a chemical toughening operation in order to increase its mechanical strength. During this operation, surface stresses are introduced, thus making it possible to obtain a higher mechanical strength compared with a glass sheet not having undergone this operation. The surface stresses introduced are of the order of 200 MPa. One of the disadvantages of this operation is that it takes a lot of time. Specifically, the inner glass sheet is kept for several hours in different salt baths in order to obtain these surface stresses. Another disadvantage of this operation is that it has a tendency to weaken the innerglass sheet. It is thus necessary to take particular precautions during its handling, thus adding yet an additional time period to the total time necessary for producing such a glass sheet. The production costs are consequently very high.

Finally, the prior art known from International patent application WO 2018/078281 discloses a glazing unit which comprises a pane which is noteworthy in that the edge of the inner glass sheet is situated beyond the edge of the plastic sheet and beyond the edge of the outer glass sheet over at least one portion of the length of the edge of said inner glass sheet and in that the edge of said inner glass sheet comprises a protective layer over at least one portion of the length of the edge of said inner glass sheet that is situated beyond the edge of said plastic sheet and beyond the edge of said outer glass sheet, and preferably the edge of said inner glass sheet comprises a protective layer over the whole of the length of the edge of said inner glass sheet that is situated beyond the edge of said plastic sheet and beyond the edge of said outerglass sheet. This protective layer makes it possible to protect the border of the innerglass sheet in order to prevent its degradation and at the same time to protect users on account of the potentially cutting character of the border of the inner glass sheet, with regard to its thickness and on account of its nature since the inner glass sheet has undergone a chemical toughening operation. The solution described in this patent application makes it possible to partly solve one of the problems associated with the handling of the inner glass sheet during its production. On the other hand, this solution does not make it possible to considerably reduce the production time.

In addition, the prior art known from European patent application no. EP 600766 discloses a relatively thick configuration of a laminated glazing unit, with a peripheral projection.

The aim of the present invention is therefore to propose a movable glazing unit arrangement which can at the same time be manufactured quickly, is of low cost, can be handled easily and has low fragility.

The present invention thus relates in its broader sense to a vehicle glazing unit as claimed in claim 1. This glazing unit comprises a pane and means for allowing the vertical translational movability of said pane with respect to a door of said vehicle, said pane being curved and laminated and comprising at least an outer glass sheet, an inner glass sheet and a sheet of adhesive material situated between said outer glass sheet and said inner glass sheet, each sheet having a peripheral ring, said pane having an upper border, a lower border, a first lateral border and a second lateral border.

Said glazing is noteworthy in that said outerglass sheet and said inner glass sheet are each a glass sheet having undergone a thermal toughening or semi-toughening treatment and each having a thickness such that the thickness of said inner glass sheet is less than or equal to the thickness of said outer glass sheet and in that the edge of said innerglass sheet is situated beyond the edge of said sheet of adhesive material and beyond the edge of said outer glass sheet only:
  over at least one portion of the length or even the whole length of said first lateral border of said pane, and/or
  over at least one portion of the length or even the whole length of said second lateral border of said pane.

The edge of said inner glass sheet is then situated beyond the edge of said sheet of adhesive material and beyond the edge of said outer glass sheet:
  only over at least one portion of the length or even the whole length of said first lateral border of said pane, and/or
  only over at least one portion of the length or even the whole length of said second lateral border of said pane, without being situated beyond the edge of said sheet of adhesive material and beyond the edge of said outer glass sheet over at least one portion of the length or even the whole length of said upper border of the pane, without being situated beyond the edge of said sheet of adhesive material and beyond the edge of said outer glass sheet over at least one portion of the length or even the whole length of said lower border of the pane.

Thus, the pane is easier to manufacture since the portion(s) of the edge of said inner glass sheet that does (do) not extend beyond the edge of said sheet of adhesive material and beyond the edge of said outer glass sheet can be such that the edge of said inner glass sheet is then in the continuation of the edge of said sheet of adhesive material and of the edge of said outer glass sheet; this (these) portion(s) can then serve as reference portion(s) for the positioning of the inner glass sheet with respect to the other two sheets during the manufacture of the pane (lamination).

The pane is even easier to manufacture when the edge of said inner glass sheet is situated beyond the edge of said sheet of adhesive material and beyond the edge of said outer glass sheet only at the same time over the whole length of said first lateral border of said pane and at the same time over the whole length of said second lateral border of said pane, since the lateral projections are easier to guide; this limits the risk of a partial lateral projection jamming during series manufacture.

The pane is a laminated pane in the sense that there is no gas space or empty space between the sheets that constitute the pane.

Advantageously, the thickness of said outer glass sheet is between 1.60 mm and 3.85 mm.

Advantageously, the thickness of said inner glass sheet is between 0.70 mm and 2.60 mm.

In a preferred embodiment of the present invention, the thickness of said inner glass sheet is between 1.00 mm and 2.20 mm.

Advantageously, said inner glass sheet has surface stresses at most of 20 MPa, of 30 MPa and of 40 MPa, respectively, for a thickness of said inner glass sheet of approximately 1.10 mm, of approximately 1.60 mm and of approximately 2.10 mm. The term "approximately" here designates a value considered by a person skilled in the art as a standard value, even if locally this value can vary within a range of more or less 10%.

According to one variant of the invention, as seen in section across the thickness of the pane, the edge of said inner glass sheet is in the continuation of the edge of said sheet of adhesive material and of the edge of said outer glass sheet over the whole length of said upper border of said pane.

According to another variant of the invention, as seen in section across the thickness of the pane, the edge of said inner glass sheet is in the continuation of the edge of said outer glass sheet over the whole length of said lower border of said pane.

Preferably, the edge of said inner glass sheet extends beyond the edge of said outer glass sheet so as to form a centrifugal offset over at least one portion of the length or even the whole length of said first lateral border and/or over at least one portion of the length or even the whole length of said second lateral border, which is between 2.0 and 30.0 mm, or even between 3.0 and 20.0 mm, said offset preferably being constant along the length of said first lateral border and/or said second lateral border.

Preferably, said offset is intended to be guided in a guiding and sealing element attached to said vehicle.

Advantageously, said outer glass sheet comprises an outer face, said outer face being situated in the continuation of a peripherally adjacent body portion of said vehicle, such as a covering part.

In the present document, for the ranges mentioned the limits of the ranges are included in the ranges.

The "edge", or "margin", designates the narrow side of a sheet that is situated substantially transversely between the two main faces of a sheet.

The fact that the edge of said inner glass sheet is situated beyond both the edge of said sheet of adhesive material and the edge of said outer glass sheet along at least one portion of its length makes it possible to produce a projection of said inner glass sheet with respect to said sheet of adhesive material and said outer glass sheet. This projection is present along one of the two lateral borders of the pane or along the two lateral borders of the pane. It is preferably not at all present along the lower border and along the upper border of the pane.

This projection is provided in a visible portion of the glazing unit; in a portion which is visible to the users of the vehicle. This projection cannot be present in a portion of the glazing unit that remains hidden within the body of the vehicle, whatever the state (open, closed, or between open and closed) of the glazing unit with respect to the body element which supports it.

In an independent and advantageous variant, the edge of said inner glass sheet extends beyond the edge of said sheet of adhesive material and beyond the edge of said outer glass sheet over only a portion of the length of the first lateral border or of the second lateral border of said innerglass sheet.

Thus, the pane is even easier to manufacture since the portion(s) of the edge of said inner glass sheet which does (do) not extend beyond the edge of said sheet of adhesive material and beyond the edge of said outer glass sheet can be such that the edge of said inner glass sheet is then in the continuation of the edge of said sheet of adhesive material and of the edge of said outer glass sheet; this (these) portion(s) can then serve as reference portion(s) for the positioning of the inner glass sheet with respect to the other two sheets during the manufacture of the pane (lamination).

In addition, this (these) portion(s) can be situated opposite means allowing the translational movability of said pane with respect to the door of said vehicle (that is to say the pane holder(s)) in order to increase the mechanical strength of the pane at this point.

The present invention has been developed for glazing units incorporated in doors having lateral jambs and an upper jamb level with the glazing unit when the latter is wound up (closed).

Especially advantageously, the present invention makes it possible to produce a glazing unit which, when it is closed, comprises an outer face which is situated in the continuation of the peripherally adjacent portion of the door; this is known under the technical notion of "flush glazing".

The present invention will be better understood on reading the following detailed description of nonlimiting exemplary embodiments and the appended figures:

FIG. 1 illustrates an outer front view of a vehicle front glazing unit according to a first embodiment of the invention;

FIG. 2 illustrates an inner front view of the glazing unit of FIG. 1;

FIG. 3 illustrates a partial view in horizontal section of a front border of the glazing unit of FIG. 1;

FIG. 4 illustrates a view in vertical cross section of a pane holder:

FIG. 5 illustrates a profile view of a vehicle front glazing unit provided with two pane holders according to the invention during the operation of attaching a pane holder.

It is specified that the proportions between the various elements represented in the figures are not strictly observed in order to facilitate the reading thereof.

FIG. 1 illustrates a left lateral glazing unit 1 of a vehicle, according to a first embodiment of the invention, considered as being seen from the outside of this vehicle.

What is concerned in particular is a lateral glazing unit of a door of a motor vehicle that is translationally movable with respect to this door substantially along the vertical between an open position in which the glazing unit is situated completely or virtually completely within the door and a closed position in which the glazing unit closes an opening of the door.

In a closed position, this glazing unit thus produces a vertical separation between an inner space I which is inside of the vehicle and an outer space E which is outside of the vehicle.

The notions of "outer" and "inner" are therefore considered in the present document with respect to this outer space E and this inner space I, respectively.

Since what is concerned is a lateral glazing unit, the latter extends essentially along the axis generally termed "the X axis" of the vehicle, which is the central longitudinal axis of advance of the vehicle equipped with the glazing unit according to the invention as lateral glazing unit of the left side of the vehicle and which corresponds to the horizontal axis in the plane of the sheet in FIG. 1.

In the context of the present document, the notion of "centripetal" and that of "centrifugal" is to be considered in the plane of the sheet in FIG. 1, expressed with respect to the center of the glazing unit, along the X and Z axes; the centripetal direction is in the direction of this center, whereas the centrifugal direction moves away from this center.

In the embodiment of FIG. 1, the glazing unit 1 is in one piece.

In the illustrated exemplary embodiment, the glazing unit 1 comprises a pane 2 which is curved (that is to say not flat) and laminated. However, for greater simplicity, it is considered in the drawings of FIGS. 1, 2 and 3 that the pane 2 is flat.

The pane 2 of the glazing unit 1 is a laminated pane which comprises, from the outside toward the inside, at least, in this order: an outer glass sheet 3, an interlayer sheet of adhesive material 4 and then an inner glass sheet 5, however, it is possible that at least one other sheet is interposed between the outer glass sheet 3 and the interlayer sheet of adhesive material 4 or between the interlayer sheet of adhesive material 4 and the inner glass sheet 5. In addition, the pane 2 has a first lateral border 23, a second lateral border 24, an upper border 25 and a lower border 26. The first lateral border 23 and the second lateral border 24 of the pane 2 are arranged respectively in the portion of the pane 2 oriented toward the front and in the portion of the pane 2 oriented toward the rear of the vehicle. The upper border 25 and the lower border 26 of the pane 2 are arranged respectively in the portion of the pane 2 oriented toward the roof and in the portion of the pane 2 oriented toward the chassis of the vehicle.

The outer glass sheet 3 has an outer face 30 which is oriented toward the outside E, an interlayer face 32 which is oriented toward the interlayer sheet of adhesive material 4, and a peripheral edge 31 situated between these two faces. In addition, the outer glass sheet 3 has a first lateral border 33, a second lateral border 34, an upper border 35 and a lower border 36. The first lateral border 33 and the second lateral border 34 of the outer glass sheet 3 are arranged respectively in the portion of the outer glass sheet 3 oriented toward the front and in the portion of the outer glass sheet 3 oriented toward the rear of the vehicle. The upper border 35 and the lower border 36 of the outer glass sheet 3 are arranged respectively in the portion of the outer glass sheet 3 oriented toward the roof and in the portion of the outer glass sheet 3 oriented toward the chassis of the vehicle.

The inner glass sheet 5 has an interlayer face 50 which is oriented toward the interlayer sheet of adhesive material 4, an inner face 52 which is oriented toward the inside I and a peripheral edge 51 situated between these two faces. In addition, the inner glass sheet 5 has a first lateral border 53, a second lateral border 54, an upper border 55 and a lower border 56. The first lateral border 53 and the second lateral border 54 of the inner glass sheet 5 are arranged respectively in the portion of the inner glass sheet 5 oriented toward the front and in the portion of the inner glass sheet 5 oriented toward the rear of the vehicle. The upper border 55 and the lower border 56 of the inner glass sheet 5 are arranged respectively in the portion of the inner glass sheet 5 oriented toward the roof and in the portion of the innerglass sheet 5 oriented toward the chassis of the vehicle.

The interlayer sheet of adhesive material 4 has an outer interlayer face 40 which is oriented toward the interlayer face 32 and which is here in contact with this interlayer face 32, an inner interlayer face 42 which is oriented toward the interlayer face 50 and which is here in contact with this interlayer face 50, and a peripheral edge 41 which is situated between these two interlayer faces 40, 42. In addition, the interlayer sheet of adhesive material 4 has a first lateral border 43, a second lateral border 44, an upper border 45 and a lower border 46. The first lateral border 43 and the second lateral border 44 of the interlayer sheet of adhesive material 4 are arranged respectively in the portion of the interlayer sheet of adhesive material 4 oriented toward the front and in the portion of the interlayer sheet of adhesive material 4 oriented toward the rear of the vehicle. The upper border 45 and the lower border 46 of the interlayer sheet of adhesive material 4 are arranged respectively in the portion of the interlayer sheet of adhesive material 4 oriented toward the roof and in the portion of the interlayer sheet of adhesive material 4 oriented toward the chassis of the vehicle.

The outer glass sheet 3 is for example a glass sheet having undergone a thermal bending operation before the manufacture of the laminated pane 2 and having a thickness $e_3$ between 1.60 and 3.85 mm, for example 3.15 mm.

The interlayer sheet of adhesive material 4 is for example a polyvinyl butyral (PVB) sheet having a thickness $e_4$ between 0.30 and 1.50 mm, for example 0.78 mm. This sheet of adhesive material 4 preferably has the same length dimensions along the X axis and height dimensions along the Z axis as the outer glass sheet 3.

The inner glass sheet 5 is a glass sheet having undergone a thermal toughening or semi-toughening operation and having a thickness $e_5$ between 0.70 and 2.60 mm, or even between 0.70 and 2.50 mm, or even between 0.70 and 2.30 mm, or even between 0.70 and 2.10 mm, for example 1.10 mm or 1.60 mm. The toughening or semi-toughening operations have the advantage of being very quick to carry out. Specifically, on average it is possible to produce approximately 20 glass sheets in one minute. Moreover, the toughening or semi-toughening operation makes it possible to introduce surface stresses of the order of 20 MPa, 30 MPa and 40 MPa, respectively, on a glass sheet having a thickness of approximately 1.10 mm, of approximately 1.60 mm and of approximately 2.10 mm.

Preferably, the inner glass sheet 5 is not curved before the manufacture of the laminated pane 2; it is this lamination which will give it its curved shape, following the shape of the outer glass sheet 3. This is made possible by virtue of the small thickness of the inner glass sheet 5.

In the case where the pane 2 comprises one or more other sheets in addition to the three mentioned above, the inner glass sheet 5 which has undergone a thermal toughening or semi-toughening operation is the sheet of the laminated pane that is innermost.

FIGS. 1 to 3 show that the pane 2 has an outer face 20 which is formed by the outer face 30 of the outer glass sheet 3, an inner face 22 which is formed by the inner face 52 of the inner glass sheet 5 and a peripheral edge 21 situated between these two face, corresponding to the peripheral edge 31 of the outer glass sheet 3, to the peripheral edge 41 of the sheet of adhesive material 4 and to the peripheral edge 51 of the inner glass sheet 5.

According to the invention, the edge 51 of the inner glass sheet 5 is situated, in a centrifugal direction, and along the X axis, beyond the edge 41 of said sheet of adhesive material 4 and beyond the edge 31 of the outer glass sheet 3 over at least one portion of the length of the edge 51 of the inner glass sheet 5, that is to say along at least one portion of the length of the edge 51 of the inner glass sheet 5.

Thus, the inner glass sheet 5 has at least one length along the X axis which is greater than that of the outer glass sheet 3.

The first lateral border 23 of the pane 2 extends longitudinally so as to form a first angle $a_{23}$ with the Z axis. The second lateral border 24 of the pane 2 extends longitudinally so as to form a second angle $a_{24}$ with the Z axis. The first angle $a_{23}$ has an absolute value between 0 and 30°. The second angle $a_{24}$ also has an absolute value between 0 and 30°. Preferably, the first angle $a_{23}$ and the second angle $a_{24}$ are substantially equal in terms of absolute value. In a particular embodiment of the invention, the first angle $a_{23}$ and the second angle $a_{24}$ have an absolute value of approximately 20°.

The edge 51 of the inner glass sheet 5 is situated, in a centrifugal direction, beyond the edge 41 of the sheet of adhesive material 4 and beyond the edge 31 of the outer glass sheet 3 both:
  over at least one portion of the length of the first lateral border 53 of the inner glass sheet 5; and even here over the whole of the length of the first lateral border 53; and
  over at least one portion of the length of the second lateral border 54 of the inner glass sheet 5; and even here over the whole of the length of the second lateral border 54.

In one alternative, the edge 51 of the inner glass sheet 5 is situated, in a centrifugal direction, beyond the edge 41 of the sheet of adhesive material 4 and beyond the edge 31 of the outer glass sheet 3 only over just a portion of the length or even over the whole length of the first lateral border 53 of the inner glass sheet 5. In another alternative, the edge 51 of the inner glass sheet 5 is situated, in a centrifugal direction, beyond the edge 41 of the sheet of adhesive material 4 and beyond the edge 31 of the outer glass sheet 5 only over just a portion of the length or even over the whole length of the first lateral border 54 of the inner glass sheet 5.

The first border 53 of said inner glass sheet 5 is thus situated, in a centrifugal direction, and along the X axis, beyond the edge 31 of said outer glass sheet 3 (and beyond the edge 41 of the sheet of adhesive material 4) so as to form a first projection 9, or centrifugal projection. This offset can be between 2.0 and 30.0 mm, or even between 3.0 and 20.0 mm, such as for example 2.85 mm here; this first projection 9 is preferably constant along its length. Moreover, the second border 54 of said inner glass sheet 5 is thus situated, in a centrifugal direction, and along the X axis, beyond the edge 31 of said outer glass sheet 3 (and beyond the edge 41 of the sheet of adhesive material 4) so as to form a second projection 9', or centrifugal projection. This offset can be between 2.0 and 30.0 mm, or even between 3.0 and 20.0 mm, such as for example 2.85 mm here; this second projection 9' is preferably constant along its length.

In one particular embodiment of the invention, the inner glass sheet 5 comprises only the first projection 9, the second border 54 being in the continuity, along the Y axis, of the edge 31 of said outer glass sheet 3 and of the edge 41 of said sheet of adhesive material 4. In another particular embodiment of the invention, the inner glass sheet 5 comprises only the second projection 9', the first border 53 being in the continuity, along the Y axis, of the edge 31 of said outer glass sheet 3 and of the edge 41 of said sheet of adhesive material 4. The geometry of the first and second projections 9, 9' is well adapted to the method of producing glass sheets given that said projections are oriented in the longitudinal direction of advance of said method. Therefore, the risk of deterioration of the glass sheet 5 is considerably reduced during its manufacture.

In FIG. 1, the weatherstrip seal 7 marks the top of the door shell within which the glazing unit 1 slides, when the glazing unit is closed. In this position of closed glazing unit, the entire portion of the glazing unit that is situated below this weatherstrip seal 7 cannot comprise an offset: in this portion below the weatherstrip seal 7, within the door shell when the glazing unit is closed, it is possible that the edge 51 of the inner glass sheet 5 over one (or more) portion(s) of its length, or even over the whole of its length, is in the continuation of the edge 31 of the outer glass sheet 3.

It is possible for example that the edge 51 of the inner glass sheet 5 is in the continuation of the edge 31 of the outer glass sheet 3 only at the point where there are the means for allowing the translational movability of the pane 2 with respect to a door of the vehicle.

Above the weatherstrip seal 7, the door of the vehicle can comprise at least one portion without jamb. Thus, it is possible that the door:
  does not comprise a front lateral jamb and that it is the adjacent body portion, otherwise termed "the A-pillar", which guides the glazing unit, and/or
  does not comprise a rear lateral jamb and that it is the adjacent body portion, otherwise termed "the B-pillar", which guides the glazing unit.

In the embodiment illustrated in FIG. 1, the edge 51 of said inner glass sheet 5 is situated at the same time beyond the edge 41 of the sheet of adhesive material 4 and at the same time beyond the edge 31 of the outer glass sheet 3 over only a portion of the perimeter of the edge 51 of the inner glass sheet 5. In this instance, the projection is present along the lateral borders but is not present either along the lower border or along the upper border of the pane.

Thus, these three edges 31, 41, 51 are in the continuation of one another along the Y axis at the bottom and top of the pane but are not in the continuation of one another along the X axis at least along the first lateral border 23 or along the second lateral border 24 of the pane 2: the edge 51 of the inner glass sheet 5 is offset in the centrifugal direction, that is to say along the X axis at least along the first lateral border 23 or along the second lateral border 24 of the pane 2, or even preferably still along the first lateral border 23 and along the second lateral border 24 of the pane.

Each sheet 3, 4, 5 has a peripheral perimeter $P_3$, $P_4$, $P_5$: the perimeter $P_5$ of the inner glass sheet 5 extends beyond the perimeter $P_4$ of the sheet of adhesive plastic material 4 and beyond the perimeter $P_3$ of the outer glass sheet 3 over at least the length of the first lateral projection 23 or at least over the length of the second projection 24 of the pane 2, or even over the length of the first projection 23 and over the length of second projection 24 of the pane 2.

The perimeter $P_5$ of the inner glass sheet 5 is in the lateral continuation of the perimeter $P_3$ of the outer glass sheet 3 only along the upper border 25 and along the lower border 26 of the pane 2; along the border 26: in the portion of the glazing unit which remains within said door when the glazing unit is closed, in order to participate in reinforcing the pane at this location so as to increase the reliability of the attachment of the pane holder to the pane.

In a variant, the edge 51 of the inner glass sheet 5 extends beyond the edge 31 of the outer glass sheet 3 so as to respectively form the first centrifugal projection 9 or the second centrifugal projection 9', or offset, along only a portion of the first lateral border 23 or of the second lateral border 24 of the pane 2, or even so as to respectively form a first centrifugal projection 9 and a second centrifugal projection 9', or offset, along only a portion of the first lateral border 23 and of the second lateral border 24 of the pane 2.

FIG. 3 illustrates a partial view in section of the first border 23 of the pane 2 and shows one of the vertical guiding elements for the glazing unit 1 that is attached to the vehicle, commonly referred to as A-pillar. The A-pillar comprises, in particular, a first guiding and sealing element 71 for translationally guiding the pane 2 along the Z axis, and a first covering part 70 having the function of hiding the guiding and sealing element 71. The first projection 9 of the first lateral border 23 is in contact with and slides between a spherical protuberance 72 and a seal 73 comprising two lips. In one alternative, the seal 73 can comprise one lip or more than two lips. Another guiding element (not visible) for the glazing unit 1 that is attached to the vehicle, commonly referred to as B-pillar, is oriented toward the rear of said vehicle. The B-pillar comprises, in particular, a second guiding and sealing element 71' for translationally guiding the pane 2 along the Z axis, and a second covering part 70' having the function of hiding the guiding and sealing element 71'. The second projection 9' (not visible) of the second lateral border 24 is in contact and slides between a spherical protuberance 72' and a seal 73' comprising two lips. In one alternative, the seal 73' can comprise one lip or more than two lips.

The glazing unit 1 comprises, apart from the pane 2, along at least one portion of at least one lower border 26, means for allowing the translational movability of the pane 2 with respect to a door of the vehicle. These means comprise at least one and preferably at least two pane holders 6, 6' having for example substantially an inverted-h shape in cross section.

FIG. 4 illustrates a detail view of a pane holder 6. This pane holder 6 thus has:
- a first portion made up of two parallel walls 63, 64 connected at their base and forming a longitudinal groove, that is to say forming a U shape in cross section, and
- a second portion made up of a tail 65 extending away from the parallel walls 63, 64 with respect to the base connecting these walls.

In the version illustrated, the assembly is performed in such a way that said parallel walls 63, 64 of said h shape clasp the pane 2 in the lower portion thereof, the tail 65 then being situated substantially in the continuation of the pane 2.

This lower h shape of the pane holder is particularly advantageous since it allows the transmission of forces of between the pane holder and the pane over a large area corresponding to the sum of the inner areas of the parallel walls 63, 64; however, it is quite possible to use a simple mounting plate, this mounting plate having for example at least two portions: a first portion for cooperating with the pane and a second portion for cooperating with the mechanism for driving (raising/lowering) the pane.

In FIG. 4, the pane 2 is curved and the parallel walls 63, 64 and the tail 65 are planar; however, it is possible that the parallel walls 63, 64 and/or the tail 65 are curved. The tail 65 extends approximately from the midpoint of the base connecting the parallel walls 63, 64, but it is also possible to position the tail 65 in the continuation of one or the other of the parallel walls 63, 64.

In FIG. 4, the tail 65 is not parallel to the walls 63, 64. With the T axis illustrating the midplane of the glazing unit 1 at its lower end when the latter is correctly positioned with respect to the pane holder 6, the tail 65 is oriented by a nonzero angle with respect to the T axis, said angle being a function of the curvature of the pane 2.

The tail 65 is intended to be connected to a motorized drive system (not illustrated) in order to allow the glazing unit 1 to be raised and lowered in the door of the vehicle.

The pane holders 6, 6' and the pane 2 are assembled on a template allowing tolerances in the pane holder 6/pane 2 assembly to be controlled.

Before the pane holders are positioned and attached, the pane 2 is first of all correctly positioned ("focused") in a mounting template 11, visible in FIG. 5, having a plurality of positioning stops.

One of the positioning stops is denoted by the designation point Y3 and is preferably positioned on the line of the weatherstrip seal 7 (not visible in FIGS. 2 to 5) illustrating the position of this bottom contact seal with the door when the glazing unit is closed.

A matrix 12, illustrated in dotted lines and secured to the reference system of the pane 2, accommodates the tail 65 of each pane holder 6.

Lower 13 and upper 14 movable jaws then clamp the tail 65.

Whatever the orientation of the pane holders 6 in the Y direction, the movable jaws 13, 14 entrap the pane holders 6 without deteriorating the isostatism.

The pane holder(s) 6, 6' is (or are) glued using an adhesive, for example polyurethane, then "slipped" onto the pane 2, that is to say that it (they) is (or are) positioned such that the pane is present in the U shape, optionally in abutment, by inserting inserts 66 made of plastic, such as for example polypropylene, between said parallel walls 63, 64 and the pane 2.

In a variant, it is proposed to replace the phase of positioning added inserts 66 with a phase of injection molding in-situ adhesive material intended to form the inserts 66, made of thermoplastic hotmelt resin, for example based on poly amide.

The injection molding of the inserts when the pane and the pane holders are correctly positioned with respect to one another thus ensures the position of the pane holder, whatever the curvature of the pane.

The hotmelt resin used has an elastic limit of approximately 5.5 N/mm² and a yield strength of 11 N/mm², calculated in accordance with standard DIN 53455. It must be used at a temperature of approximately 220'C and has at this temperature a viscosity of the order of 5000 mPa·s, measured in accordance with standard ASTM D 3236.

During the implementation of this solution, it is also possible to use an additional adhesive in order to perfectly attach the insert to the parallel walls and to the pane.

The inserts 66, which are added or manufactured in-situ by injection molding thus serve to retain the pane 2 in relation to the parallel walls 63, 64 with respect to lateral forces.

The pane holders used are preferably made of aluminum alloy. By way of example, with a 6060 aluminum alloy (AGS), a vertical pressing force of 30 to 50 tons is sufficient, that is to say in relation to the size of the pane holders, pressures of approximately 150 GPa for h-shaped pane holders of overall size of approximately 40×30 mm and of approximately 450 GPa for h-shaped pane holders of overall size of approximately 60×60 mm.

The present invention has been described in the foregoing by way of example. It will be understood that a person skilled in the art will be able to implement various variants of the invention without thereby departing from the scope of the patent as defined by the claims.

The invention claimed is:

1. A vehicle glazing unit comprising a pane and means for allowing the vertical translational movability of said pane with respect to a door of said vehicle, said pane being curved and laminated and comprising at least an outer glass sheet, an inner glass sheet and a sheet of adhesive material situated between said outer glass sheet and said inner glass sheet, each sheet having a peripheral edge, said pane having an upper border, a lower border, a first lateral border and a second lateral border, wherein said outer glass sheet and said inner glass sheet are each a glass sheet having undergone a thermal toughening or semi-toughening treatment and each having a thickness such that the thickness of said inner glass sheet is less than or equal to the thickness of said outer glass sheet, and wherein the peripheral edge of said inner glass sheet is situated beyond the peripheral edge of said sheet of adhesive material and beyond the peripheral edge of said outer glass sheet only:
over at least one portion of a length or a whole length of said first lateral border of said pane, and/or
over at least one portion of a length or a whole length of the second lateral border of said pane.

2. The glazing unit as claimed in claim 1, wherein the thickness of said outer glass sheet is between 1.60 mm and 3.85 mm.

3. The glazing unit as claimed in either claim 1, wherein the thickness of said inner glass sheet is between 0.70 mm and 2.60 mm.

4. The glazing unit as claimed in claim 3, wherein the thickness of said inner glass sheet is between 1.00 mm and 2.20 mm.

5. The glazing unit as claimed in claim 1, wherein said inner glass sheet has surface stresses of at most 20 MPa when a thickness of said inner glass sheet is approximately 1.10 mm.

6. The glazing unit as claimed in claim 1, wherein, as seen in section across the thickness, the peripheral edge of said inner glass sheet is in a continuation of the peripheral edge of said sheet of adhesive material and of the peripheral edge of said outer glass sheet over a whole length of said upper border of said pane.

7. The glazing unit as claimed in claim 1, wherein, as seen in section across the thickness, the peripheral edge of said inner glass sheet is in a continuation of the peripheral edge of said outer glass sheet over a whole length of said lower border of said pane.

8. The glazing unit as claimed in claim 1, wherein the peripheral edge of said inner glass sheet extends beyond the peripheral edge of said outer glass sheet so as to form a centrifugal projection over at least one portion of the length or the whole length of said first lateral border and/or over at least one portion of the length or he whole length of said second lateral border, which is between 2.0 and 30.0 mm.

9. The glazing unit as claimed in claim 1, wherein said centrifugal projection is intended to be guided in a guiding and sealing element attached to said vehicle.

10. The glazing unit as claimed in claim 1, wherein said outer glass sheet comprises an outer face, said outer face being situated in a continuation of a peripherally adjacent body portion of said vehicle.

11. The glazing unit as claimed in claim 8, wherein the length of said second lateral border is between 3.0 and 20.0 mm.

12. The glazing unit as claimed in claim 8, wherein said projection is constant over the length of said first lateral border and/or of said second lateral border.

13. The glazing unit as claimed in claim 10, wherein said peripherally adjacent body portion of said vehicle is a covering part.

14. The glazing unit as claimed in claim 1, wherein said inner glass sheet has surface stresses of at most 30 MPa when a thickness of said inner glass sheet is approximately 1.60 mm.

15. The glazing unit as claimed in claim 1, wherein said inner glass sheet has surface stresses of at most 40 MPa when a thickness of said inner glass sheet is approximately 2.10 mm.

16. The glazing unit as claimed in claim 1, wherein a glass surface forming the peripheral edge of said inner glass sheet that is situated beyond the peripheral edge of said sheet of adhesive material and beyond the peripheral edge of said outer glass sheet forms an external surface of the pane.

\* \* \* \* \*